July 16, 1963    R. L. LINCOLN    3,097,410
DUST COLLECTOR
Filed Feb. 9, 1961
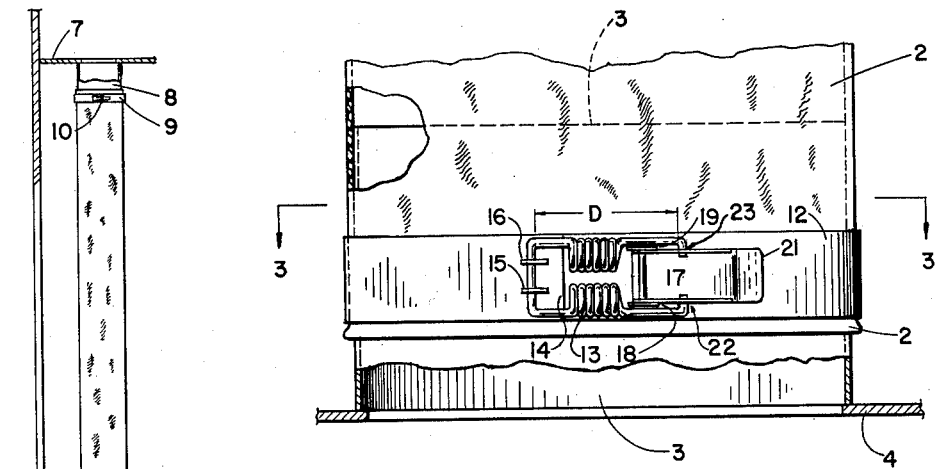
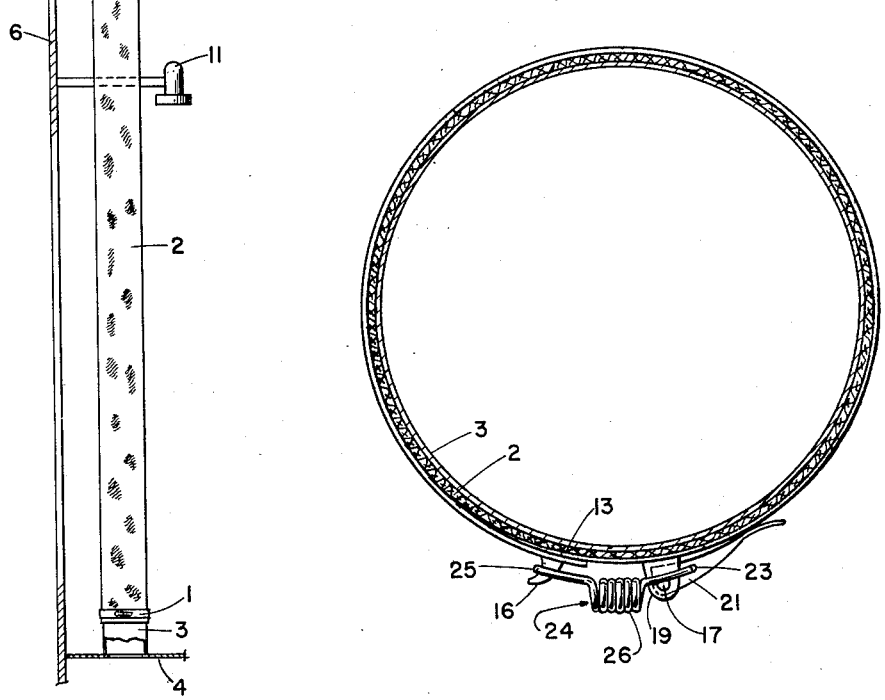
FIG. 1    FIG. 4    FIG. 3
INVENTOR.
ROLAND L. LINCOLN
BY

3,097,410
DUST COLLECTOR
Roland L. Lincoln, Macungie, Pa., assignor to Fuller Company, a corporation of Delaware
Filed Feb. 9, 1961, Ser. No. 88,201
2 Claims. (Cl. 24—270)

The present invention relates to the filtering of dust from gases, and is more particularly concerned with the tensioning of filter media.

In filtering hot gases, dust collectors are subject to thermal expansion, which complicates proper tensioning of filter media such as filter bags. Proper, adequate tension is particularly important when the bags are to be cleaned by generated waves such as sound waves. If the bags are properly tensioned "cold," they are often overstressed by expansion of the collector casing. This is particularly true for bags of considerable length.

In a common type of filter-bag dust collector, the gas is introduced to the inside of the bag through its bottom end, while the top end is capped or closed off to prevent the escape of uncleaned gas. This arrangement permits this top cap to be spring suspended. With such a spring suspension, a tension within any desired limits can be maintained in an axial or vertical direction. This tension has been found to be advantageous in increasing bag life and improving bag cleaning efficiency.

However, with the gas entering the hopper below the bags, and passing up into the bags through the lower ends thereof, certain undesirable results are encountered. The entering gas then flows in a direction opposite or countercurrent to any dust falling into the hopper, and the dust is thereby frequently re-entrained in the gas stream. Also, when the incoming gas stream enters the hopper at a relatively high velocity, it can agitate or stir-up the dust already accumulated in the hopper and similarly re-entrain it in the gas stream.

Therefore, in many instances, it is preferred to introduce the dust into the bag through their upper ends, leaving the lower ends free to discharge the dust into the hopper without interference by the gas stream. However, one serious disadvantage has been encountered in this type of collector. The top collar is, of necessity, attached to an upper crown sheet and so both ends of the filter bags are structurally interconnected by crown sheets, and therefore are fixed in position. This prevents the use of the bag-tensioning spring otherwise used at the closed top ends of the bags.

The present invention contemplates individually controlling the tension of open-ended, tubular filter bags, even though their upper and lower ends are both mounted on relatively rigid crown sheets.

In general, the preferred form of the present invention comprises a tensioning clamp having a clamping member or band to be passed about an end of the filter bag, and a resiliently-adjusted coupling for tightening the band to clamp the bag end against the crown sheet collar.

The resilient means of the clamp is arranged to limit the clamping effect to a predetermined value in relation to a safe tensile loading for the particular fabric comprising the filter bag.

A better understanding of the invention may be derived from the accompanying drawings and description, in which:

FIG. 1 is a side view showing a filter bag secured according to the invention;

FIG. 2 is a side view on an enlarged scale showing the bag clamp;

FIG. 3 is a view taken on lines 3—3 of FIG. 2; and

FIG. 4 is a view similar to FIG. 3 showing the clamp in its open position.

As shown in the drawings, the preferred embodiment of the present invention comprises a tensioning clamp 1 clamping one end of an elongated filter bag 2 to a collar 3 of a crown sheet 4. The crown sheet 4 forms a part of a dust collector including a side wall 6 and a crown sheet 7 which is opposite the crown sheet 4. A collar 8 protrudes from the crown sheet 7, which is structurally connected to the crown sheet 4 by the side wall 6, and carries the other end of the filter bag 2 secured thereto by a locking clamp 9. The clamp 9 is locked by a screw 10. A wave generator 11, such as a horn, is provided for periodic cleaning of the bags as disclosed in Patent No. 2,769,506 to Harry I. Abboud.

The tensioning clamp 1 comprises a clamping member or band 12 having free ends 13 and 14. The length of the band is sufficient to allow the free end 14 to overlap the other end 13.

The end 14 carries a pair of hooks 15 and 16 facing away from the end of the band. The end 13 carries a transverse hinge pin 17, secured in a pair of mounts 18 and 19, which has a toggle or cam lever 21 rotatably mounted thereon. The lever 21 has a pair of aligned, off-center seat holes 22 and 23 spaced along the length thereof from the hinge pin 17. The seat holes 22, 23 are off-center in that they are located on the lever at a point between the hinge pin 17 and the band 12 when the lever is in clamping position, as shown in FIG. 3. The seat holes 22 and 23 receive the free ends of a U-shaped spring 24, so that the spring locks itself upon the lever. The off-center locations of the seat holes 22 and 23 permit the lever to swing past dead center so that the spring holds the lever in clamping position by exerting tension along a line between the hinge pin and the band 12.

The base 25 of the U-shaped spring 24 is remote from the lever, and is arranged to engage the hooks 15 and 16. Each leg of the U-shaped spring 24 intermediate the base 25 and the free end thereof includes a coil section 26 on each leg. The spring 24 and lever 21 thus form a resilient coupling between the free ends 13 and 14 of the clamping band 12.

The tension of the spring 24, in its clamping position, is determined by the size of the wire from which it is made, the design and number of coils in the coil sections 26, and the spring-loading distance "D" between the hooks 15, 16 and the seats 22, 23 when the lever 21 is in clamping position. Many variations common to the art of spring making may be used to obtain the desired tension between the ends 13 and 14 of the clamping band 12.

The desired spring tension depends, among other things, upon the tensile strength of the fabric of which the filter bags are to be made. The tensile loading on the filter bags is a function of the actual friction between the bag and the collar 3 to which it is clamped. The actual friction is, in turn, determined by the frictional coefficients of the fabric and the collar surfaces; the area of fabric clamped by the band 12 (which varies with the width of the band and the diameter of the bag), and the pressure exerted against the clamped area of the fabric by the band. The latter two variables are of greater importance, since not too great an effective variation is usually found between the frictional characteristics of the various filter-bag fabrics and bag collars.

A tensile loading along the filter bag in the order of 50 pounds has been found satisfactory for the common types of filter fabrics, including glass fabrics, which are more brittle or delicate than most other such fabrics.

A specific installation according to the invention included a plurality of 8 inch diameter, tubular, woven glass-cloth bags 25 feet long. The bags were fixed on collars (8) at their upper ends by locking clamps. The lower-end collars (3) were formed from the ordinary, smooth steel tubing usually used for that purpose. The clamping band of each tensioning clamp was approximately one and one-eighth inch wide. The springs tested included wires ranging from 22 gauge to 32 gauge, with corresponding modification of their original or unloaded length.

The spring loading distance "D" together with the various spring designs produced, in each case, a spring tension in clamping position, of about 20–22 pounds at a working temperature of about 500° F.

This circumferential tension of 20–22 pounds produced an appropriate total frictional force between the surface of the metal collar and the clamped area of the filter bag. The frictional effect was limited, however, by the resilient coupling of the ends 13 and 14, so that the tensional loading along the filter bags was limited to approximately 50 pounds.

Therefore, as the side wall 6 of the collector expanded under the influence of higher temperature, the tensioning clamps allowed the associated ends of the bags to slip on their collars just enough to relieve any tensional force exceeding the desired 50 pounds. This maintained a minimum "hot" tensile loading on the bags in the order of 45 to 50 pounds, so that the bags remained sufficiently taut to permit efficient cleaning by the wave generator 11. If the dust collector cools off, as will happen when it is shut down for repairs, the shrinking of the structure interconnecting the crown sheets 4 and 8 will allow the bags to slacken. Upon resumption of high temperature service, however, the expansion of the structure will reestablish the desired bag tension.

Various changes may be made in the details of the invention as disclosed without departing from the scope of the invention or sacrificing the advantages thereof.

I claim:

1. A tensioning clamp comprising a clamping band adapted to encircle an article to be clamped, a lever mounted on said band adjacent one end thereof for swinging about an axis, a loop having a generally U-shaped portion, hook means on said band adjacent to the other end thereof adapted to be engaged by the base of said U-shaped portion and means for anchoring the distal ends of the respective legs to said loop, each of the legs of said U-shaped portion including spring portions which are extensible in a direction longitudinally of said legs.

2. A tensioning clamp according to claim 1 in which the extensible portions are coil springs.

References Cited in the file of this patent

UNITED STATES PATENTS

| | | |
|---|---|---|
| 740,390 | Bronson | Oct. 6, 1903 |
| 1,079,042 | Duncan | Nov. 18, 1913 |
| 1,454,492 | Stroud | May 8, 1923 |
| 1,833,904 | Keys | Dec. 1, 1931 |
| 1,912,280 | Kleisser | May 30, 1933 |
| 2,069,691 | Wilson et al. | Feb. 2, 1937 |
| 2,338,504 | Foster | Jan. 4, 1944 |
| 2,854,091 | Roberts et al. | Sept. 30, 1958 |
| 2,942,127 | Harse | June 21, 1960 |

FOREIGN PATENTS

| | | |
|---|---|---|
| 199,111 | Great Britain | June 13, 1923 |
| 256,319 | Great Britain | Aug. 4, 1926 |